United States Patent [19]

Mathez

[11] Patent Number: 5,027,504

[45] Date of Patent: Jul. 2, 1991

[54] DEVICE FOR FITTING THE HANDS ON TO A WATCH MOVEMENT

[75] Inventor: Bernard E. Mathez, La Chaux-de-Fonds, Switzerland

[73] Assignee: Lemrich & Cie S.A., Switzerland

[21] Appl. No.: 553,162

[22] Filed: Jul. 13, 1990

[30] Foreign Application Priority Data

Jul. 14, 1989 [CH] Switzerland ........................ 2661/89

[51] Int. Cl.[5] .............................................. B23P 19/00

[52] U.S. Cl. ........................................ 29/823; 29/177; 29/281.4; 29/281.5; 29/822

[58] Field of Search ................. 29/177, 700, 231, 783, 29/787, 791, 795–797, 281.4, 281.5, 822, 823

[56] References Cited

U.S. PATENT DOCUMENTS

| | | | |
|---|---|---|---|
| 3,346,943 | 10/1967 | Nilsen et al. | 29/700 |
| 3,377,691 | 4/1968 | Kasper et al. | 29/797 |
| 3,979,900 | 9/1976 | Dörflinger et al. | 29/177 |
| 4,024,677 | 5/1977 | Meister et al. | 29/177 |
| 4,118,923 | 10/1978 | Bourquard | 29/177 |

FOREIGN PATENT DOCUMENTS

| | | | |
|---|---|---|---|
| 610174 | 4/1979 | Switzerland | 29/177 |
| 657843 | 1/1986 | Switzerland . | |
| 1413593 | 7/1988 | U.S.S.R. | 29/177 |

*Primary Examiner*—P. W. Echols

*Attorney, Agent, or Firm*—Kane, Dalsimer, Sullivan, Kurucz, Levy, Eisele and Richard

[57] ABSTRACT

The device comprises a frame (1 to 6) on which a carriage (7) is mounted so as to slide horizontally and carrying three vices (8, 9, 10) which can move vertically in order to grip the second, minute and hour hands, respectively. The device also comprises apparatus for positioning and locking the carriage in a first position in which the vices are situated above the hands to be gripped, and in three other successive positions in which the vices are respectively opposite the sroddles of the movement (36).

5 Claims, 2 Drawing Sheets

DEVICE FOR FITTING THE HANDS ON TO A WATCH MOVEMENT

FIELD OF THE INVENTION

The subject of the present invention is a device for fitting the hands on to a watch movement.

PRIOR ART

In order to fit hands, use is still being made today of a tool, on the platform of which a fitting device is provided in order to position the movement. The hand is placed on its sroddle, or its barrel, respectively, by means of tweezers, after which the hand is driven home on its sroddle by a punch mounted on the tool. Not only are these operations awkward and tedious, but, given the small size of the hands, a large number of hands are spoiled or destroyed during these handling operations. When the hand is driven home on its sroddle, a large number of movements are also rendered unusable.

SUMMARY OF THE INVENTION

The object of the invention is to provide a fitting device enabling this fitting to be performed reliably and quickly, without any awkward handling and without any risk of the hands or the movement being destroyed.

The device according to the invention comprises a carriage mounted so as to slide horizontally on a frame and carrying at least two vices which slide vertically and are equipped with springs returning them to the upper position, these vices being designed so as to grip the hands by their eye, means for supporting and positioning the hands to be fitted, means for supporting and positioning the movement which is to receive the hands, means for automatically locking the carriage in given positions, namely a position in which the vices are opposite the hands to be gripped and successive positions in which the vices are successively and respectively opposite the sroddles of the movement which is to receive the hands, and means for unlocking the carriage.

In order to fit the hour hand, the minute hand and the second hand, a carriage is used carrying three vices. In the first locked position of the carriage, the user need only press on the three vices for each of them to grip their hand. The user then unlocks the carriage so as to be able to displace it towards the movement. The carriage is then automatically locked in a first position, in which the vice carrying the hour hand is exactly above the barrel intended to receive the hour hand. The operator then need only press again on the vice in order to place the hour hand. The operator then actuates the means for unlocking the carriage so as to free it and enable it to be displaced a little further in the same direction. The carriage is again automatically locked in a new position in which the second vice carrying the minute hand is opposite the minute sroddle. The operation is repeated a last time for placing the second hand. The operator then unlocks the carriage for a slightly longer time so that it passes the two adjacent locking positions, and he then returns the carriage to its initial position where it is automatically locked again above the means for supporting and positioning the hands, in order to grip new hands.

The device may be easily actuated automatically, in synchronization with means for advancing a belt carrying the hands to be fitted and a belt carrying the movements, in order to form an automatic hand-fitting installation.

BRIEF DESCRIPTION OF THE DRAWINGS

The attached drawing shows, by way of example, an embodiment of the invention.

DESCRIPTION OF THE PREFERRED EMBODIMENT

Figure 1:
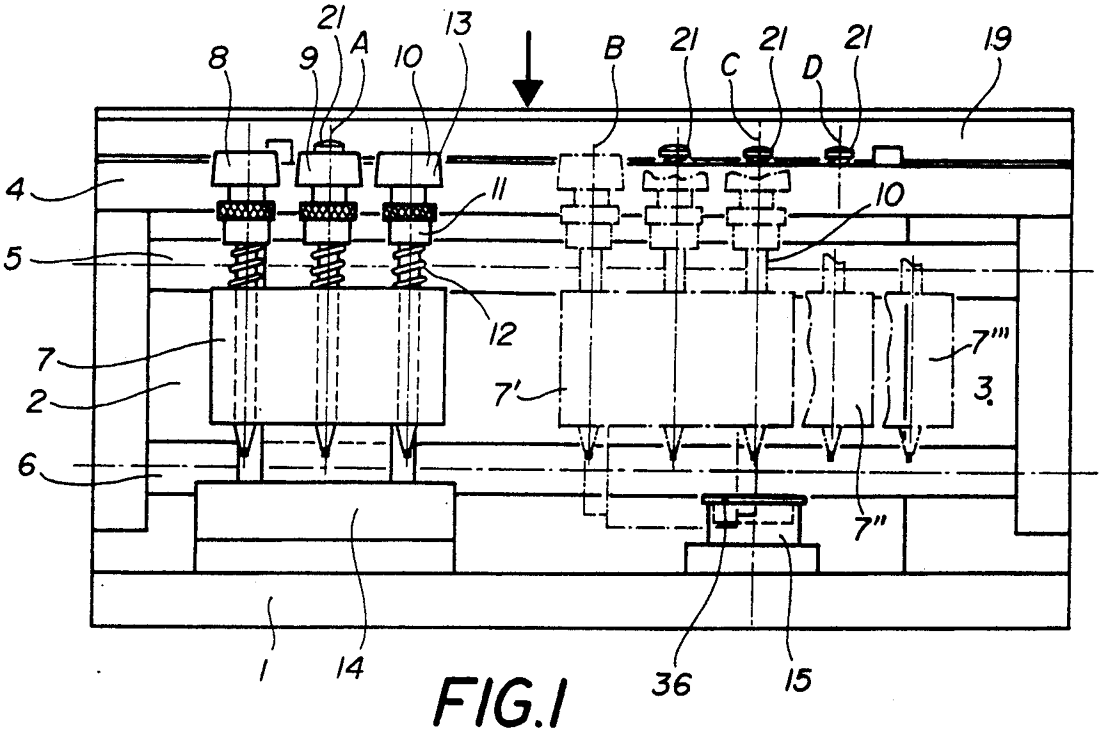
FIG. 1 is a view in elevation, from the front, of the fitting device.

The device shown in FIG. 1 comprises a frame consisting of a platform provided with two pillars 2 and 3 carrying a crosspiece 4 and two parallel cylindrical bars 5 and 6 between the platform 1 and the crosspiece 4. A carriage 7 is mounted on the bars 5 and 6 by means of two axial ball bearings. The carriage 7 carries three parallel vertical vices 8, 9 and 10. These vices are furthermore situated in a vertical plane parallel to the axes of the bars 5 and 6. These vices are identical in their upper part. They comprise a nut 11 and a spring 12 working in compression between the nut and the top of the carriage 7. The nut 11 may be dispensed with in mass production, the spring 12 then working between the head 13 of the vice and the carriage 7. The vices may slide freely in bores in the carriage 7.

Near its left end, the platform 1 carries a means for supporting and positioning the hands, which means consists of a plate 14 having a hole at each of the three locations provided for receiving the eye of the hour hand, the minute hand and the second hand, respectively. The role which these holes play will be explained later. On the right, the platform 1 carries a means 15 for supporting and positioning the movement which is to receive the hands.

Figure 2:
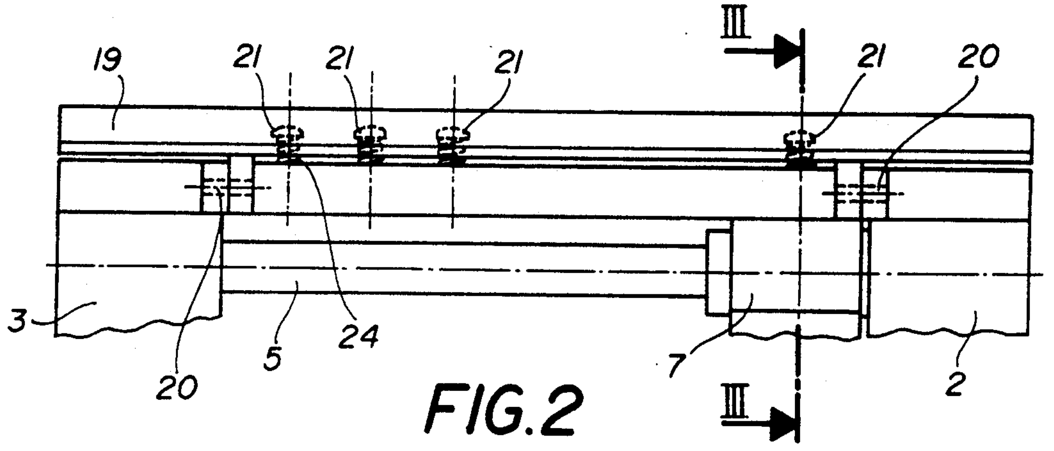
FIG. 2 is a partial view, from behind, of this device.
Figure 3:
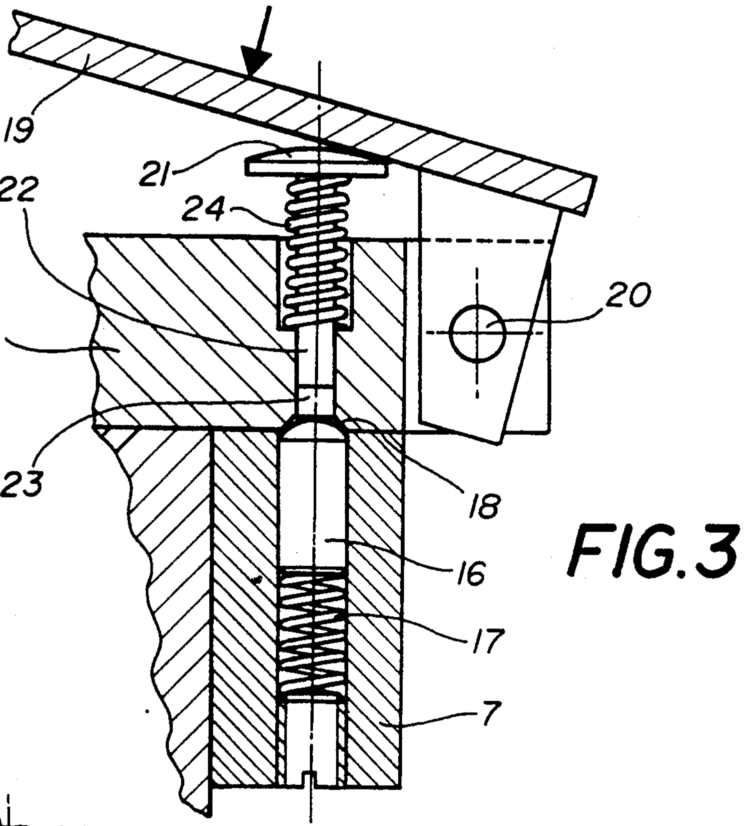
FIG. 3 is a detailed view in cross-section along III—III in FIG. 2.

The device furthermore comprises means for positioning and automatically locking the carriage in certain positions. These positioning and locking means are shown in FIGS. 2 and 3. They consist, on the one hand, of a vertical sliding finger 16 mounted on the carriage 7 and pushed upwards by a spring 17. The positioning and locking means consist, on the other hand, of conical recesses 18 provided in the lower face of the crosspiece 4, into which recesses the finger 16, pushed by the spring 17, may penetrate in order to position and lock the carriage 7 in this position. Between the recesses 18, the end of the finger 16 slides on the crosspiece 4 during the displacement of the carriage. The device furthermore comprises unlocking means consisting of a lever 19 articulated at the rear of the crosspiece 4 at two points about a horizontal shaft 20 and extending above the crosspiece 4 over the entire length of this crosspiece. This lever 19 bears against the heads 21 of vertical push rods 22 sliding freely in holes 23 opening into the recesses 18. Each push rod 22 is held in its upper position by a spring 24 working in compression against a countersink provided in the crosspiece 4, and the head 21 of the push rod. The springs 24 therefore also hold the lever 19 in the angled position shown in FIG. 3. The recesses 18 and the push rods 22 number four, in the positions designated by A, B, C and D in FIG. 1. Pressure on the lever 19 causes all the push rods 22 to be depressed, the finger 16 being pushed out of its recess 18, unlocking the carriage 7.

Figure 4:
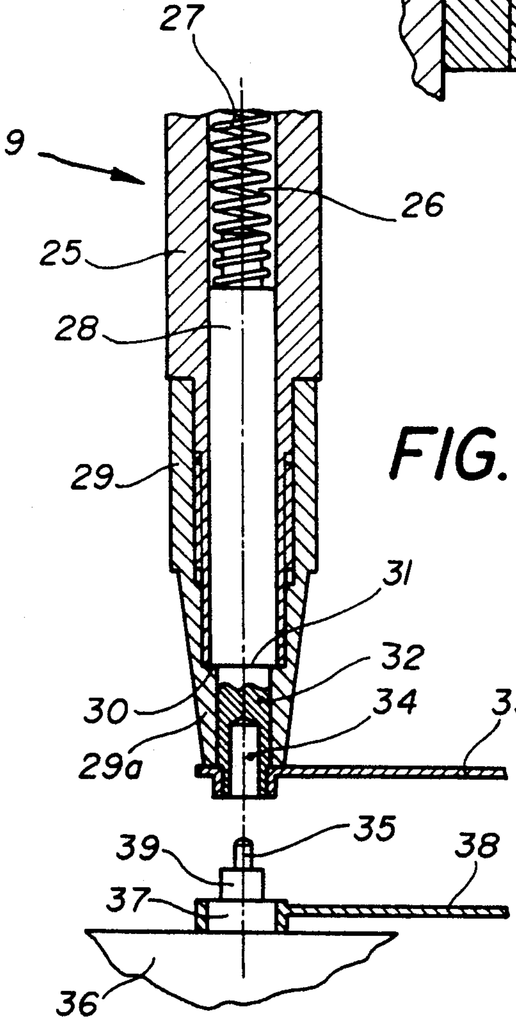
FIG. 4 is a view in axial cross-section through the lower part of the vice for the minute hand, after this hand has been gripped.
Figure 5:
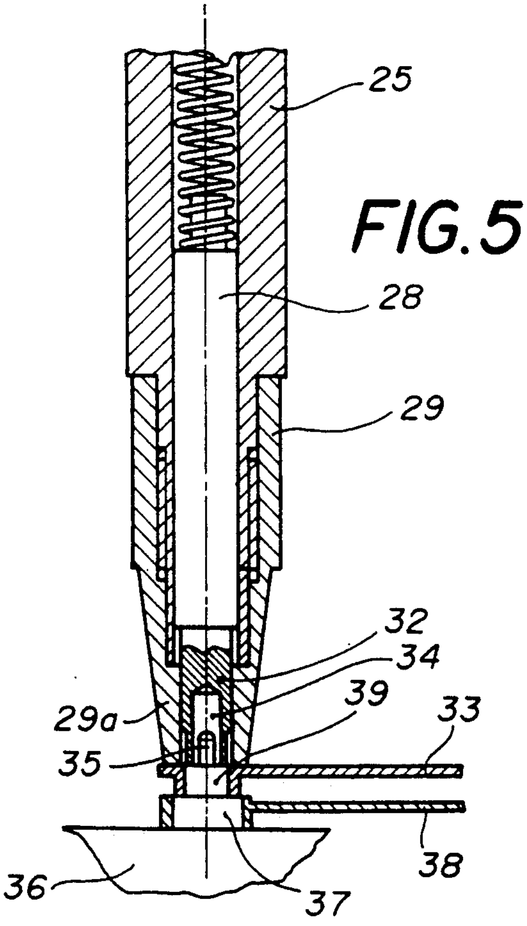
FIG. 5 shows the same vice during the fitting of the minute hand.

The vices are shown in FIGS. 4 and 5. They are made virtually identically. The vice shown is that used to fit the minute hand. This vice comprises a cylindrical body 25 sliding in the bore of the carriage 7. This body 25 has a bore 26 containing a spring 27 and in which a rod 28 slides. A tubular piece 29 is fixed to the lower end of the body 25 and has a conical part 29*a* and an inner bearing surface 30 against which butts a bearing surface 31 of the rod 28, the lower part 32 of which therefore has a smaller diameter than the part sliding in the bore 26. When at rest, when the bearing surface 31 of the rod is in abutment with the bearing surface 30, the end of the part 32 projects from the end of the part 29. This projecting part is slightly conical and has an average diameter corresponding to the diameter of the eye of the minute hand 33. The part 32 furthermore has an axial blind hole 34 with sufficient clearance for the sroddle 35 of the second hand. A movement 36 has also partially been shown in FIG. 4, in which the barrel 37 of the barrel wheel has already received the hour hand 38.

It should furthermore be added that the carriage 7 virtually abuts the pillars 2 and 3 when it is locked in positions A and D, so that when it abuts one or the other of the pillars, the locking finger 16 may engage in the corresponding recess 18 so as to position the carriage exactly in its locked position.

The fitting device is used as follows:

Once the carriage 7 has come into abutment with the pillar 2, it is positioned and locked in position A. In this position, the operator simultaneously presses on the three vices 8, 9 and 10. The rods 28 of these vices 8, 9 and 10 grip the second hand, the minute hand and the hour hand, respectively. The force causing the rods 28 to penetrate into the hands is supplied by the springs 27. The vices 8, 9 and 10 are then released and return to the position shown in FIG. 4. The operator then presses on the unlocking lever 19 and pushes the carriage 7 towards the right, in other words towards the movement support 15. As soon as the carriage 7 has moved, the operator releases the unlocking lever 19. When the finger 16 of the carriage comes opposite the recess 18 of position B, the carriage 7 is again locked and positioned. This position is shown in dot-dash lines 7'. In this position, the vice 10 is situated exactly above the sroddles of the movement 36. The user then presses on the head of this vice 10, the rod of which has a blind hole similar to the blind hole 34 in FIG. 4 but with a larger diameter in order to enable the sroddle 39 of the minute hand to penetrate. The hour hand 38 is driven home on its barrel 37 by the vice, the rod 28 being pushed back inside the vice. FIGS. 4 and 5 show the vice used to fit the minute hand, and this fitting of the minute hand will therefore be described in more detail.

Once the hour hand 38 has been fitted, the operator presses briefly on the unlocking lever 19 and pushes the carriage 7 by a small amount toward the pillar 3. The finger 16 of the carriage is then locked in position C, the carriage being in position 7''. In this position, the vice 9 is exactly above the sroddle of the movement, as shown in FIG. 4. The operator then presses on the vice. The end of the part 32 of the rod abuts the end of the sroddle 39 of the minute hand of the movement and the sroddle 35 of the second hand penetrates into the blind hole 34. The body 25 of the vice continues to be depressed and the end of the conical part 29*a* drives the hand 33 home on its sroddle 39. The operator then releases the vice 9, presses briefly on the unlocking lever 19 and pushes the carriage 7 into abutment with the pillar 3. Once the lever 19 has been released, the finger 16 positions and locks the carriage 7 in the position 7''', in which position the vice 8 carrying the second hand assumes the position of the vice 9 shown in FIG. 4. The operator presses on the vice 8 in order to fit the second hand and he then presses the unlocking lever 19 until the carriage is approximately in the center of the frame. When the carriage 7 abuts the pillar 2, it is automatically repositioned and locked in position A. The vices are then ready to collect a new set of hands.

The device lends itself particularly well to mechanical, in particular pneumatic, actuation, given the positioning and automatic locking means. It may be incorporated in a completely automatic hand-fitting installation. In this case, the support 14 is replaced by a belt running stepwise beneath the vices. Similarly, the support for the movement is replaced by a belt bringing the movements in a stepwise manner and successively beneath the vices. The various operations may be controlled and synchronized by simple means.

The invention may, of course, have numerous variants, both in terms of the guidance of the carriages, and the positioning and locking means, the unlocking means, the number of vices, etc.

I claim:

1. A device for fitting the hands on to a watch movement, which comprises a carriage (7) mounted so as to slide horizontally on a frame (1 to 6) and carrying at least two vices (8, 9, 10) which slide vertically and are equipped with springs (12) returning them into the upper position, these vices being designed so as to grip the hands by their eye, means (14) for supporting and positioning the hands to be fitted, means (15) for supporting and positioning the movement which is to receive the hands, means (16, 18) for positioning and automatically locking the carriage in given positions (A, B, C, D), namely a position (A) in which the vices are opposite the hands to be gripped and successive positions (B, C, D) in which the vices are successively and respectively opposite the sroddles of the movement which is to receive the hands, and means (19, 22) for unlocking the carriage.

2. The device as claimed in claim 1, wherein each vice consists of a tubular body (25) in which is mounted a retractable sliding rod (28), pushed by a spring (27) and the slightly conical end (32) of which has an average diameter corresponding to the eye of the hand to be gripped, the rods intended for the fitting of the minute and hour hands having an axial clearance hole (34).

3. The device as claimed in claim 1, wherein the means for positioning and automatically locking the carriage consist of a finger (!6) spring-mounted on the carriage and interacting with positioning recesses (18) on the frame, and wherein the unlocking means consist of push rods (22) equipped with return springs (24) and mounted opposite each recess, and of a lever (19) for actuating the push rods extending along the frame, pressure on the lever causing the locking finger to be pushed out of the recess which it occupies.

4. The device as claimed in claims 1, wherein the carriage (7) is mounted on two cylindrical bars (5, 6) via axial ball bearings.

5. An automatic installation for fitting hands on to watch movements, comprising a device as claimed in claim 1, wherein the hands to be fitted are positioned on a moving belt, wherein the movements also move past on a belt, and wherein the unlocking of the carriage, its displacement and the actuation of the vices are controlled automatically and actuated mechanically, electrically or pneumatically.

* * * * *